United States Patent [19]

Moorhouse et al.

[11] Patent Number: 5,697,444
[45] Date of Patent: Dec. 16, 1997

[54] CARBOXYALKYL SUBSTITUTED POLYGALACTOMANNAN FRACTURING FLUIDS

[75] Inventors: Ralph Moorhouse, Richboro; Ian William Cottrell, Yardley, both of Pa.

[73] Assignee: Rhone-Poulenc Inc., Cranbury, N.J.

[21] Appl. No.: 806,348

[22] Filed: Feb. 26, 1997

Related U.S. Application Data

[62] Division of Ser. No. 428,263, Apr. 25, 1995, Pat. No. 5,614,475.
[51] Int. Cl.⁶ .................................................. E21B 43/247
[52] U.S. Cl. .................................. 166/308; 507/273
[58] Field of Search .................................. 166/270, 308, 166/280, 281, 283; 507/271, 273, 103

[56] References Cited

U.S. PATENT DOCUMENTS

| | | | |
|---|---|---|---|
| 3,762,485 | 10/1973 | Chesser et al. | 175/65 |
| 4,460,751 | 7/1984 | Hanlon et al. | 525/371 |
| 4,477,360 | 10/1984 | Almond | 252/8.55 |
| 4,488,975 | 12/1984 | Almond | 252/8.55 |
| 4,579,670 | 4/1986 | Payne | 252/8.55 |
| 4,692,254 | 9/1987 | Kucera | 252/8.551 |
| 4,702,848 | 10/1987 | Payne | 252/8.551 |
| 4,753,740 | 6/1988 | Marleit et al. | 252/8.55 |
| 4,801,389 | 1/1989 | Brannon et al. | 252/8.551 |
| 5,103,913 | 4/1992 | Nimerick et al. | 166/308 |
| 5,266,224 | 11/1993 | Sharif | 252/8.551 |
| 5,271,466 | 12/1993 | Harms | 166/300 |
| 5,305,832 | 4/1994 | Gupta et al. | 166/300 |
| 5,445,223 | 8/1995 | Nelson et al. | 166/308 |

*Primary Examiner*—Frank Tsay
*Attorney, Agent, or Firm*—Andrew M. Solomon

[57] ABSTRACT

A novel fracturing fluid composition comprising:

(1) a carboxyalkyl derivatized polygalactomannan having a degree of substitution of between about 0.01 and about 3.0;
(2) a zirconium salt crosslinking agent;
(3) one or more thermal stabilizing agents;
(4) one or more pH buffers; and
(5) water;

wherein said fluid is capable of maintaining at least 10 percent of its original cross-linked viscosity after three hours at a temperature greater to or equal to 250° F. is provided.

7 Claims, No Drawings

CARBOXYALKYL SUBSTITUTED POLYGALACTOMANNAN FRACTURING FLUIDS

This application is a division of application Ser. No. 08/428,263 filed Apr. 25, 1995 which application is now U.S. Pat. No. 5,614,475.

BACKGROUND OF THE INVENTION

1. Field of the Invention

The present invention relates to polymers which are useful in oil recovery as fracturing fluids. More particularly, the invention provides a fracturing fluid composition which includes as a thickening agent a carboxyalkyl derivatized polygalactomannan and a zirconium crosslinking agent wherein the resulting fluid demonstrates excellent stability over a period of time at high temperatures.

2. Technology Description

It is well known that production in petroleum, natural gas and geothermal wells can be greatly enhanced by hydraulic fracturing techniques. These techniques are known in the art and generally comprise introducing an aqueous solution of a water-soluble polymer (e.g. Guar Gum) in which "proppants" (e.g. coarse sand or sintered bauxite or synthetic ceramic materials) are suspended through the well bore under extremely high pressures into the rock structure in which the petroleum, gas or steam is entrained. Minute fissures in the rock are thereby created and held open by the suspended particles after the liquid has drained off. The petroleum, gas or steam can then flow through the porous zone into the well.

Polysaccharides e.g. guar and guar derivatives are the most commonly used water-soluble polymers for hydraulic fracturing. Aqueous solutions of guar and guar derivatives develop increased viscosity upon the addition of various metal ions. Viscoelastic gels are formed by the chemical linking or cross-linking of two or more polymer chains. The result is a more ordered network structure which increases the effective molecular weight and thereby, the viscosity. The stability of these high viscosity cross-linked gels is dependent on many factors including pH and temperature. The viscosity stability of water-soluble polymer solutions as a function of time and temperature, is crucial for successful applications in the oil field area.

Thermal stability is a major factor in selecting a water-soluble polymer for wells having high bottom-hole temperatures. It is well known that crosslinked fracturing fluids degrade with time as a function of temperature and shear, resulting in a loss of viscosity and proppant carrying ability in a short time at temperatures of 250° F. and above.

The observed loss of viscosity as a function of time, temperature and shear, is the result of degradation by several pathways, for example chemical, biological and mechanical. Biological degradation can be minimized by the proper choice of biocide. Mechanical degradation is the result of applying a critical stress to the gel, resulting in chain scission. Its effect can be minimized by the use of properly engineered surface equipment, etc.

There are two chemical pathways of importance. One is hydrolysis of the glycosidic linkage, resulting in scission of the polysaccharide chain. The other is oxidative/reductive depolymerization. Acid catalyzed hydrolysis of the glycosidic bond is well documented. The rate of degradation by glycosidic bond hydrolysis is dependent on reaction time, system pH and temperature. Oxidative/reductive depolymerizations involve the oxidation of the polysaccharide by a radical pathway in the presence of oxygen. Transition metal ions, (e.g. iron) can promote these processes. This thermal degradation of the gels can be minimized by the addition of oxygen scavengers such as sodium thiosulfite, methanol, thiourea and sodium thiosulfate and by avoiding extremely high or low pH conditions.

In practice, carboxymethylhydroxypropyl guar has been the polygalactomannan of choice for use in fracturing fluids. This material has shown an excellent ability to effectively crosslink and establish a desirable viscosity profile. However, despite its widely successful use, improvements can be made in discovering other thickening agents which provide excellent long term stability at high temperatures without being expensive to manufacture.

Examples of art discussing fracturing fluids which include polygalactomannan thickening agents, preferably carboxymethylhydroxypropyl guar include the following: U.S. Pat. No. 5,305,832; U.S. Pat. No. 4,477,360; U.S. Pat. No. 4,488,975; U.S. Pat. No. 4,579,670; U.S. Pat. No. 4,692,254; U.S. Pat. No. 4,702,848; U.S. Pat. No. 4,801,389; U.S. Pat. No. 5,103,913; U.S. Pat. No. 4,460,751; U.S. Pat. No. 4,579,670; and U.S. Pat. No. 5,271,466. While several of these patents suggest that carboxyalkyl guar polygalactomannans may be used as thickening agents, they fail to recognize that under specific conditions, carboxyalkyl guars can be used which demonstrate excellent viscosity retention while utilizing a minimal amount of crosslinking agent.

Despite the above teachings, there still exists a need in the art for novel fracturing fluid formulations which demonstrate excellent viscosity retention at high temperatures and which utilize a minimal amount of chemical materials.

BRIEF SUMMARY OF THE INVENTION

In accordance with the present invention novel fracturing fluid formulations which demonstrate excellent viscosity retention at high temperatures and which utilize a minimal amount of chemical materials are provided. More particularly, these fluid formulations include carboxyalkyl derivatized polygalactomannans as polymers useful for thickening an aqueous fluid.

One embodiment of the present invention provides:

A novel fracturing fluid comprising:

(1) a carboxyalkyl derivatized polygalactomannan having a degree of substitution of between about 0.01 and about 3.0;

(2) a zirconium salt crosslinking agent;

(3) one or more thermal stabilizing agents;

(4) one or more pH buffers; and (5) water;

wherein said fluid is capable of maintaining at least 10 percent of its original cross-linked viscosity after three hours at a temperature greater to or equal to 250° F.

In particularly preferred embodiments, the carboxyalkyl polygalactomannan selected is carboxymethyl guar, the zirconium crosslinking agent is a zirconium lactate salt, the thermal stabilizer is sodium thiosulfate and the pH buffer is selected to yield a final composition having a pH of about 8.5 to about 10.0. Even more preferred embodiments comprise the use of clay stabilizers such as KCl and carboxyalkyl polygalactomannan materials which contain an amount of borate groups.

Still another embodiment of the present invention comprises a process for fracturing subterranean formations by pumping the inventive fracturing fluid into a wellbore and maintaining the fluid in the wellbore such that it maintains at least 10 percent of its initial crosslinked viscosity for a period of three hours at a temperature of at least 250° F.

An object of the present invention is to provide a novel fracturing fluid.

Still another object of the present invention is to provide a process for using the novel fracturing fluid.

These, and other objects, will readily be apparent to those skilled in the art as reference is made to the detailed description of the preferred embodiment.

DETAILED DESCRIPTION OF THE PREFERRED EMBODIMENT

In describing the preferred embodiment, certain terminology will be utilized for the sake of clarity. Such terminology is intended to encompass the recited embodiment, as well as all technical equivalents which operate in a similar manner for a similar purpose to achieve a similar result.

The present invention relates to a novel fracturing fluid which includes as its chief component a thickening agent comprising a carboxyalkyl substituted polygalactomannan.

The first component of the blend comprises one or more carboxyalkyl derivatized polygalactomannans having a degree of substitution of between about 0.01 and about 3.0. Particularly preferred are polygalactomannans having a degree of substitution of between about 0.01 and about 0.30, with a degree of substitution of between about 0.05 and about 0.20 being most preferred.

The polygalactomannans am polysaccharides composed principally of galactose and mannose units and are usually found in the endosperm of leguminous seeds, such as guar, locust bean, honey locust, flame tree, and the like. Guar flour, for example, is composed mostly of a galactomannan which is essentially a straight chain mannan with single membered galactose branches. The mannose units are linked in a 1-4-β-glycosidic linkage and the galactose branching takes place by means of a 1–6 linkage on alternate mannose units. The ratio of galactose to mannose in the guar polymer is, therefore, one to two.

Locust bean gum is also a polygalactomannan gum of similar molecular structure in which the ratio of galactose to mannose is one to four. Guar and locust bean gum are the preferred sources of the polygalactomannans, principally because of the commercial availability thereof.

In use the polygalactomannan is derivatized with a carboxyalkyl group, wherein alkyl represents a group having between one and about six carbon atoms. Examples of such polygalactomannans include carboxymethyl guar, carboxyethyl guar, carboxypropyl guar, and the like. Particularly preferred is the use of carboxymethyl guar.

Salts of the above polygalactomannans such as the alkaline, alkaline earth or quaternary salts may also be practiced within the scope of the present invention. Examples of specific salts include lithium, sodium, potassium and ammonium salts, with sodium carboxymethyl guar being a particularly preferred salt.

By the term "degree of substitution" as employed herein is meant the average substitution of carboxyalkyl groups per anhydro sugar unit in the polygalactomannan gums. In guar gum, the basic unit of the polymer consists of two mannose units with a glycosidic linkage and a galactose unit attached to a hydroxyl group of one of the mannose units. On the average, each of the anhydro sugar units contains three available hydroxyl sites. A degree of substitution of three would mean that all of the available hydroxyl sites have been esterified.

The carboxyalkyl polygalactomannan may also include an amount of borate material. This is usually accomplished by adding an amount of borax (in either its decahydrate, anhydrous or pentahydrate form) during the derivatization reaction of the polygalactomannan splits. In practice, the amount of borate present in the carboxyalkyl polygalactomannan ranges from about 1 to about 1000 parts per million parts of carboxyalkyl polygalactomannan, with amounts ranging from about 1 to about 50 parts per million parts of carboxyalkyl polygalactomannan being even more preferred.

In practice, the preferred carboxyalkyl polygalactomannan selected is carboxymethyl guar. This material is typically synthesized by adding sodium monochloroacetate to guar gum splits under alkaline conditions. Borate functionality can be provided as described above by adding borax to the splits during the derivatization reaction.

A further feature of the present invention is that the resulting polygalactomannan contains low levels of hydroxycarboxylic acid salt by-products, particularly sodium glycolate as chemical impurities. The level of carboxylic acid by-product of the inventive materials is less than about 0.25 weight percent, more preferably less than about 0.20 weight percent and most preferably less than about 0.15 weight percent.

Also considered as being expressly covered by the term carboxyalkyl polygalactomannan are carboxyalkyl polygalactomannans which may have a slight amount of hydroxyalkyl groups attached to the polygalactomannan molecule (i.e., polygalactomannans having a molecular substitution (M.S.) of less than 0.07). Preferred hydroxyalkyl groups comprise hydroxypropyl groups. Accordingly, carboxymethylhydroxypropyl guar containing hydroxypropyl groups having a molecular substitution level of less than 0.07 are expressly covered.

Another embodiment of the present invention resides in a carboxyalkylhydroxyalkyl polygalactomannan, preferably carboxymethylhydroxypropyl guar gum having less than about 0.25 percent hydroxy carboxylic acid salt by-product, more preferably less than about 0.20 weight percent and most preferably less than about 0.17 weight percent and between 1 and about 50 parts of borate per million parts polygalactomannan wherein the alkyl portion of the carboxyalkyl and hydroxyalkyl groups each independently represents a group having between one and about six carbon atoms in such an embodiment, the D.S. of the carboxyalkyl group is as defined above and the M.S. of the hydroxyalkyl group is between about 0.01 and 3.0, more preferably between about 0.05 and about 0.50 and most preferably between about 0.10 and about 0.35.

The amount of carboxylated polygalactomannan in the fracturing fluid comprises between about 25 to about 100 pounds per 1000 gallons of fluid. Even more preferred is the use of between about 40 to about 60 pounds per 1000 gallons of fluid with an amount of about 60 pounds per 1000 gallons of fluid being most preferred.

The second component of the fracturing fluid comprises the crosslinking agent. The crosslinking agent is defined as any zirconium salt which is capable of crosslinking the carboxyalkyl polygalactomannan prior to or upon introduction into a well bore. Preferred crosslinking agents include those with zirconium in the +4 oxidation state. Examples include zirconium triethanolamine complexes, zirconium citrate, zirconium acetylacetonate, zirconium lactate, zirconium carbonate, zirconium diisopropylamine lactate and chelates of an organic alpha-hydroxycarboxyllic acid and zirconium. Particularly preferred is the use of zirconium lactate, zirconium citrate and mixtures thereof.

The crosslinking agent is admixed with the carboxyalkyl polygalactomannan such that the amount of zirconium is in the range of from 0.01 pound to about 10 pounds per thousand gallons of aqueous fluid, preferably from about 0.025 to about 2.5 pounds per thousand gallons of aqueous fluid, and even more preferably between about 0.1 to about 0.5 pounds per thousand gallons of aqueous fluid. A most preferred amount comprises the addition of about 1 gallon of crosslinking agent per 1000 gallons of fluid. This corresponds to an amount of about 0.4 pounds of zirconium per 1000 gallons of fluid.

The crosslinking agent can be admixed with the polygalactomannan in any suitable mixing apparatus and can be a particulate solid or a liquid solution in a suitable solvent such as water or an alcohol.

The third component of the novel fracturing fluid comprises one or more thermal stabilizing agents. Any thermal stabilizing agent that is known in the art for use in connection with fracturing fluids and specifically those which are used as oxygen scavengers may be selected. Such materials include sodium thiosulfate, methanol, thiourea and sodium thiosulfite and mixtures thereof. Particularly preferred is the use of sodium thiosulfate.

The thermal stabilizing agent is preferably added in an amount of about 5 to about 35 pounds per 1000 gallons of fluid, more preferably between about 15 to about 25 pounds per 1000 gallons of fluid and most preferably about 20 pounds per 1000 gallons of fluid.

The fourth component of the novel fracturing fluid comprises one more pH buffers selected to provide the fracturing fluid with a desired pH. Particularly preferred is the production of fluids having a pH greater than about 8.5. More preferred are fluids having a pH of between about 8.5 and about 10.5 and even more preferred are fluids having a pH of between about 8.5 and about 10.0.

The pH buffer may be selected from basic materials such as sodium or potassium carbonate, sodium or potassium bicarbonate, sodium or potassium hydroxide, sodium or potassium diacetate, monosodiumphosphate or monopotassiumphosphate and mixtures thereof. Particularly preferred are mixtures of sodium carbonate and sodium bicarbonate in ratios of 25:75 to 75:25. The total amount of pH buffer added is that which is used to provide the desirable pH profile. For example, when using a mixture of sodium carbonate and sodium bicarbonate, about 20 to about 25 pounds per 1000 gallons of fluid are added.

The final essential component of the fracturing fluid is water. The water that comprises the balance of the fluid may be either deionized or contain ions. Particularly surprising results have occurred when using so-called "hard" water which may contain any of the following metallic ions: magnesium ions, sodium ions and calcium ions as major components. Other ionic species may be present in minor amounts. The respective amounts of ions in the water typically range from about 10 to about 50 ppm magnesium ions, about 100 to about 300 ppm sodium ions and about 50 to about 150 ppm calcium ions.

The fracturing fluid may further include other additives commonly found in fracturing fluids. Such additives include, for example clay stabilizers. The most common clay stabilizer is KCl, with other stabilizers such as quaternary ammonium salts also being available for use. The amount of the clay stabilizer added is typically between about 1.0 to about 5.0 percent by weight of the fluid, with amounts between about 2.0 and about 3.0 percent being more preferred.

Still other additives include proppants which may be provided with the fracturing fluid to maintain the fissures caused by pumping and thickening the fracturing fluid into the wellbore. Any proppant commonly used in fracturing fluids may be selected with examples including sand, fine gravel, sintered bauxite, glass beads and the like. The propped fracture provides larger flow channels through which an increased quantity of a hydrocarbon can flow, thereby increasing the productive capability of a well. The proppant can be admixed with the fracturing fluid in an amount from about 0 pounds per gallon of aqueous liquid up to as many pounds of proppant material as may be pumped. Typical amounts range from about ½ pound to about 20 pounds per gallon of fracturing fluid.

Other additives such as antifoaming agents, surfactants, corrosion inhibitors, gel breakers and the like may also be present in the fracturing fluid.

Producing the fracturing fluid comprises simply mixing the various components together in the above-listed amounts. For example, the compositions of the present invention may be prepared by mixing water, and optional additives such as clay stabilizers and antifoaming agents to form a mixwater. The mixwater is placed in a blender, and, while in an agitated state the required quantity of carboxyalkyl polygalactomannan is added. Mixing occurs for approximately 30 minutes to fully hydrate the polygalactomannan. Thereafter the desired amount of pH buffer and thermal stabilizer is added. This solution is mixed for a period of time necessary to effect solubilization. The resulting gel is aged, typically for at least about one hour.

The zirconium cross-linking agent may, if necessary, be diluted with deionized water before use. The diluted solution is allowed to age for at least about 30 minutes prior to use. It may be added to the above fluid prior to, or at the time of introduction into the wellbore. Addition of the cross-linking agent, combined with agitation produces a highly viscous fluid which can be used in a fracturing operation.

To use the novel fracturing fluid it is introduced into a well bore at a feed rate, pressure and shear rate necessary to create fissures into the subterranean formation at high temperatures. In practice, the viscosity of the fracturing fluid at 350° F. at a shear rate of 40 sec$^{-1}$ upon introduction into a wellbore ranges from about 1000 cps to about 2500 cps.

The inventive fracturing fluid possesses the advantage of maintaining a high viscosity at high temperatures for an extended period of time. A longer time period at a high viscosity in the well bore enables optimal placement of the proppant within the fissures, and hence, better recovery of oil and/or gas. The present fracturing fluid is capable of maintaining at least 10 percent of its initial viscosity, preferably at least 20 percent of its initial viscosity, and even more preferably at least 30 percent of its initial viscosity at or greater than 250° F., preferably at or greater than 300° F., and most preferably at or greater than 350° F. three hours after introduction into the wellbore. This viscosity profile is considered novel for carboxyalkyl polygalactomannan derivative fracturing fluids.

As will be shown in the examples, the inventive formulation performs comparably, if not in fact better than commercial carboxymethythydroxypropyl guar derivatives, which are considered state of the art thickening agents for fracturing fluids. The performance is obtained without requiring any hydroxyalkyl derivatization of the polygalactomannan, and can be accomplished by using lesser amounts of crosslinking agent as compared to using traditional carboxymethylhydroxypropyl guar derivatives, which typically have an M.S. for the hydroxypropyl groups of at least 0.10. This results in a financial benefit as material costs for the fracturing fluid are significantly lessened.

The invention is described in greater detail by the following non-limiting examples.

EXAMPLE 1

Production of Carboxymethyl Guar

A first solution is produced by dissolving 20 parts of sodium monochloroacetate and 0.015 parts of borax in 50 parts of water. Thereafter, 100 parts of double purified guar gum splits are added to the solution at 25° C. and the solution is allowed to mix for 15 minutes. A second solution is prepared by dissolving about 18 parts of 50% NaOH solution in 25 parts of water and this solution is added to the first solution. Air is evacuated from the first solution and is purged with nitrogen gas for about three cycles. The solution is heated to about 140° F. and is maintained at that temperature for about one hour. A third solution of 0.05 parts of borax in 10.00 parts of water is prepared and added to the first solution. The first solution is cooled to about 130° F. About 0.50 parts of carbon dioxide are added to the first solution and the first solution is cooled to about 120° F. The produced batch is washed and milled to yield a final product. The final product is carboxymethyl guar gum having a degree of substitution of carboxymethyl groups of about 0.14, a carboxylic acid salt by-product level of about 0.15 weight percent and amount of borate of about 30 parts per one million parts of carboxymethyl guar gum.

EXAMPLE 2

Production of Novel Fracturing Fluid

A first solution is produced by adding 167 parts of KCl and about 20 parts of sodium thiosulfate to 8350 parts of water containing about 95 ppm $Ca^{2+}$, about 25 ppm $Mg^{2+}$, and about 220 ppm $Na^+$. About 60 parts of the composition produced in Example 1 is added to the solution. While in a stirred state, about 22.5 parts of a pH buffer containing sodium carbonate and sodium bicarbonate are added to yield a solution pH of about 9.5. A crosslinking solution of zirconium lactate or zirconium citrate is added such that 0.4 parts of zirconium are provided to the solution. The solution is stirred for a period of 30 seconds to allow complete dispersion of crosslinking agent in the fracturing fluid.

EXAMPLE 3

The procedure of Examples 1 and 2 are repeated except that the amounts of sodium monochloroacetate and borax are added such that the resulting composition has a D.S. of 0.27 and about 80 parts of borax per million parts polygalactomannan. In addition the crosslinking solution is added such that the amount of zirconium added is 1.5 times that in Example 2 (i.e. 0.6 parts zirconium).

EXAMPLE 4

The procedure of Examples 1 and 2 are repeated except that the amounts of sodium monochloroacetate and borax are added such that the resulting composition has a D.S. of 0.15 and about 200 parts of borax per million parts polygalactomannan.

EXAMPLE 5

The procedure of Examples 1 and 2 are repeated except that the amounts of sodium monochloroacetate and borax are added such that the resulting composition has a D.S. of 0.14 and about 150 parts of borax per million parts polygalactomannan. In addition the crosslinking solution is added such that the amount of zirconium added is 1.5 times that in Example 2 (i.e. 0.6 parts zirconium).

COMPARATIVE EXAMPLE 6

For use as a comparison, carboxymethylhydroxypropyl guar having a D.S. of 0.10 and a M.S. of 0.34 is used. In addition the crosslinking solution is added such that the amount of zirconium added is 1.5 times that in Example 2 (i.e. 0.6 parts zirconium).

Experimental Testing

The viscosity profile for the above compositions is measured by using a Fann 50. The configuration of the Fann 50 is as follows: 340° F. (preheated bath), B1B2 cup and bob configuration, 40 $sec^{-1}$ (100 rpm) constant shear and 400 psi ($N_2$). These conditions simulate introduction of the fluid into a wellbore. Viscosity is measured once the sample reaches a temperature of 340° F. by chart units and is converted to the unit of centipoises.

Results from the Fann 50 measurements are shown in the following Table, with the numerical value for each Example being in centipoises.

| Time (hr) | Example 2 cps | Example 3 cps | Example 4 cps | Example 5 cps | Comp. Ex. 6 cps |
| --- | --- | --- | --- | --- | --- |
| 0 | 1801 | 3458 | 960 | 492 | 1911 |
| 0.25 | 1540 | | | | 1540 |
| 0.5 | 1288 | 3605 | 692 | 472 | 1383 |
| 0.75 | 1230 | | | | 1079 |
| 1 | 1014 | 2329 | 750 | 680 | 836 |
| 1.25 | 1063 | | | | 649 |
| 1.5 | 795 | 1488 | 607 | 516 | 468 |
| 1.75 | 1041 | | | | 352 |
| 2 | 646 | 967 | 538 | 471 | 254 |
| 2.25 | 395 | | | | 194 |
| 2.5 | 277 | 603 | 462 | 462 | 153 |
| 2.75 | 228 | | | | 157 |
| 3 | 206 | 488 | 462 | 462 | 174 |
| 3.25 | 181 | | | | 160 |
| 3.5 | 116 | | | | 85 |
| 3.75 | 100 | | | | 98 |
| 4 | 84 | | | | 94 |

Of the above compositions tested, Example 2 provides the best overall behavior in terms of viscosity control and minimal use of crosslinking agent. The Example 3 composition provides too high of an initial viscosity. Example 4 provides too rapid of initial crosslinking and requires 1.5 times the amount of crosslinking agent. Example 5 provides too low of an initial viscosity and Comparative Example 6 requires the use of 1.5 times the amount of crosslinking agent.

Having described the invention in detail and by reference to the preferred embodiments thereof, it will be apparent that modifications and variations are possible without departing from the scope of the appended claims.

What is claimed is:

1. A process for fracturing a subterranean formation which comprises introducing into said formation at a temperature of greater than 250° F. and at a flow rate and pressure sufficient to produce a fracture in said formation a fracturing fluid comprising
   (1) a carboxyalkyl derivatized polygalactomannan having a degree of substitution of carboxyalkyl groups of between about 0.01 and about 3.0;

(2) a zirconium salt crosslinking agent;

(3) one or more thermal stabilizing agents;

(4) one or more pH buffers; and (5) water;

and maintaining said fluid in said formation for at least three hours such that said fluid maintains at least 10 percent of its original cross-linked viscosity.

2. The process according to claim 1 wherein said polygalactomannan is selected from the group consisting of carboxymethyl guar, carboxyethyl guar, carboxypropyl guar, their salts and mixtures thereof.

3. The process according to claim 1 wherein said polygalactomannan further comprises borate groups in an amount of about 1 to about 1000 parts per million parts of carboxyalkyl polygalactomannan.

4. The process according to claim 1 wherein the degree of substitution of carboxyalkyl groups is between about 0.05 and about 0.20.

5. The process according to claim 1 wherein the zirconium in said crosslinking agent is present in an amount of about 0.1 pounds to about 0.5 pounds per 1000 gallons of fluid.

6. The process according to claim 1 wherein said water further comprises from about 10 to about 50 ppm magnesium ions, from about 100 to about 300 ppm sodium ions and from about 50 to about 150 ppm calcium ions.

7. The process according to claim 1 wherein said fluid maintains at least 10 percent of its original cross-linked viscosity after three hours at a temperature greater to or equal to 350° F.

* * * * *

UNITED STATES PATENT AND TRADEMARK OFFICE
Certificate

Patent No.5,697,444            Patented:December 16, 1997

On petition requesting issuance of a certificate for correction of inventorship pursuant to 35 U.S.C. 256, it has been found that the above identified patent, through error and without deceptive intent, improperly sets forth the inventorship.

Accordingly, it is hereby certified that the correct inventorship of this patent is: Ralph Moorhouse, Richboro, PA, Ian William Cottrell, Yardley, PA, David N. Harry, Sugarland, TX and Lester E. Matthews, Midland, TX.

Signed and Sealed this Seventh Day of August, 2001.

DAVID J. BAGNELL
*Supervisory Patent Examiner*
Art Unit 3672